United States Patent
Johnson et al.

(10) Patent No.: US 11,280,411 B1
(45) Date of Patent: Mar. 22, 2022

(54) MULTI-PART VALVE ASSEMBLY

(71) Applicant: ValveWorks, LLC, Dallas, TX (US)

(72) Inventors: Daniel E. Johnson, Double Oak, TX (US); Edward P. Cox, Cumby, TX (US); Starr L. Pitzer, Jr., Dallas, TX (US)

(73) Assignee: ValveWorks, LLC, Dallas, TX (US)

( * ) Notice: Subject to any disclaimer, the term of this patent is extended or adjusted under 35 U.S.C. 154(b) by 0 days.

(21) Appl. No.: 17/009,580

(22) Filed: Sep. 1, 2020

(51) Int. Cl.
| | |
|---|---|
| *F16K 1/36* | (2006.01) |
| *E21B 34/08* | (2006.01) |
| *B21J 15/02* | (2006.01) |
| *F16B 19/05* | (2006.01) |

(52) U.S. Cl.
CPC ............... *F16K 1/36* (2013.01); *B21J 15/022* (2013.01); *E21B 34/08* (2013.01); *F16B 19/05* (2013.01)

(58) Field of Classification Search
CPC ........ F16K 31/0655; F16K 47/06; F16K 1/36; F16K 1/46; F04B 53/1027; E21B 21/01; E21B 34/08; B21J 15/022; F16B 19/05
See application file for complete search history.

(56) References Cited

U.S. PATENT DOCUMENTS

| | | | |
|---|---|---|---|
| 1,261,405 A * | 4/1918 | Kraft | B60C 29/04 |
| | | | 152/430 |
| 1,721,114 A | 7/1929 | Hampton et al. | |
| 1,861,420 A | 5/1932 | Mahan | |
| 2,093,662 A | 9/1937 | Steirly | |
| 2,483,572 A | 10/1949 | Cater | |
| 2,745,631 A * | 5/1956 | Shellman | F04B 53/1027 |
| | | | 251/175 |
| 2,751,291 A * | 6/1956 | Carter | C22C 38/08 |
| | | | 420/87 |
| 2,792,016 A * | 5/1957 | Shellman | F16K 1/46 |
| | | | 137/516.29 |
| 2,898,082 A | 8/1959 | Von Almen et al. | |
| 2,903,235 A | 9/1959 | Rodgers et al. | |

(Continued)

FOREIGN PATENT DOCUMENTS

| | | |
|---|---|---|
| EP | 0 823 577 A2 | 2/1998 |
| GB | 0401667 A | 11/1933 |

(Continued)

OTHER PUBLICATIONS

Capudean, Bob; Metallurgy Matters: Carbon content, steel classifications, and alloy steels; Aug. 28, 2003; The Welder; (Year: 2003).*

*Primary Examiner* — Lee A Holly
(74) *Attorney, Agent, or Firm* — John G. Fischer, Esq.; Scheef & Stone, L.L.P.

(57) ABSTRACT

The present disclosure discloses a multi-component valve system for use in pumps such as fracking pumps for use in subterranean resource production. The assembly includes an insert retainer having a retainer head and a retainer pin. The retainer pin has an upper section extending below the retainer head and a grooved center section below the upper section. A valve is centered on the upper section of the retainer pin. An insert is located on the valve. A guide has a central portion centered on the upper section of the retainer pin and four legs extending from the central portion. A collar has a flange and a collar body that is swaged into the center section of the retainer pin.

12 Claims, 6 Drawing Sheets

(56) References Cited

U.S. PATENT DOCUMENTS

| | | | |
|---|---|---|---|
| 3,057,372 A | 10/1962 | Sutton et al. | |
| 3,063,467 A | 11/1962 | Roberts, Jr. et al. | |
| 3,070,120 A | 12/1962 | Wendt | |
| 3,092,139 A | 6/1963 | Rodgers et al. | |
| 3,154,096 A | 10/1964 | Bell | |
| 3,202,178 A | 8/1965 | Wolfe | |
| 3,324,880 A | 6/1967 | Roberts et al. | |
| 3,409,039 A | 11/1968 | Griffin | |
| 3,483,885 A | 12/1969 | Leathers | |
| 3,869,956 A | 3/1975 | Breer | |
| 4,076,212 A | 2/1978 | Leman | |
| 4,180,097 A | 12/1979 | Sjoberg | |
| 4,518,329 A | 5/1985 | Weaver | |
| 4,545,404 A | 10/1985 | Redwine | |
| 4,860,995 A | 8/1989 | Rogers | |
| 4,983,085 A * | 1/1991 | Gray | B25B 13/48 411/336 |
| 5,030,413 A | 7/1991 | Knierriem et al. | |
| 5,088,521 A * | 2/1992 | Johnson | E21B 21/01 137/516.29 |
| 5,193,577 A | 3/1993 | de Koning | |
| 5,227,120 A * | 7/1993 | Leland | F27B 14/10 219/137 R |
| 5,275,204 A | 1/1994 | Rogers et al. | |
| 5,687,792 A | 11/1997 | Rodger et al. | |
| 6,808,157 B1 | 10/2004 | Mudge et al. | |
| 7,159,731 B2 | 1/2007 | Kai | |
| 7,641,175 B1 | 1/2010 | Blume | |
| 7,721,753 B2 | 5/2010 | Wears | |
| 9,470,226 B2 | 10/2016 | Johnson et al. | |
| 10,760,568 B2 | 9/2020 | Johnson et al. | |
| 2006/0202150 A1 * | 9/2006 | Johnson | F16K 47/06 251/336 |
| 2007/0000544 A1 | 1/2007 | Thompson | |
| 2007/0246673 A1 * | 10/2007 | Bircann | F16K 31/0655 251/129.15 |
| 2011/0180163 A1 | 7/2011 | Jakubowski | |
| 2012/0074687 A1 | 3/2012 | Mitchell | |
| 2017/0356440 A1 * | 12/2017 | Johnson | F04B 53/1027 |
| 2020/0016688 A1 * | 1/2020 | Wilson | F16H 55/06 |

FOREIGN PATENT DOCUMENTS

| | | |
|---|---|---|
| GB | 1300086 A | 12/1972 |
| GB | 1483317 A | 8/1977 |

* cited by examiner

MULTI-PART VALVE ASSEMBLY

RELATED APPLICATIONS

None

TECHNICAL FIELD

The disclosed design relates to a valve assembly for use in reciprocating, positive displacement pumps, such as mud pumps, well service pumps, and other industrial applications. More particularly, the disclosed design is especially suitable for use in a fracking pump for subterranean production services. More specifically, the presently disclosed design relates to a multi-part valve assembly of various materials constructed in a novel manner that replaces conventional two- and three-part welded valves.

BACKGROUND

Valves have been the subject of engineering design efforts for many years, and millions of them have been used. The engineering development of valves has stagnated in this crowded and mature field of technology. Improvements have been elusive in recent years, even as the cost of materials and manufacturing continued to climb.

The basic valve structure is present in several U.S. patent publications. Some of these describe conventional methods of building a valve, and others describe methods that have been rejected by industry. Fewer disclosures teach multiple component valves, as valves having multiple components have heretofore been disfavored for a number of reasons. Primarily, they are viewed as more costly to manufacture. Multiple components require multiple manufacturing steps, assembly steps, and fit-tolerances requirements that valves having fewer parts do not have. Secondly, each assembly and connection are deemed a potential failure points, so these valves are, again, disfavored.

Fracking valves are a particular valve used to pump hard material into a production wellbore for the purpose of fracturing the reservoir containing formations to increase fluid flow into the wellbore. Such pumps are reciprocating, positive displacement pumps in which the valves are held closed by springs and open and close by differential pressure. The pumps deliver clear fluids or slurries through simple poppet valves that are activated (opened and closed) by the fluid pressure differential generated when the mechanical energy of the pump is converted into fluid pressure.

In oil and gas exploration, there are two common reciprocating, positive displacement applications; mud pumps and well service pumps. The disclosed design is also appropriate in both of these categories as well as other, general industrial reciprocating, positive displacement applications. Pump valves in these applications must be guided as they move back and forth about an axis parallel to the fluid flow. The guides may be "stems" or "wings" and these may be on either side or both sides of the valve. They must remain an inseparable part of the pump valve during its useful life.

Due to the hardness of the material being pumped, valves include a soft seating material, such as a urethane insert, such that a seal can be obtained. The softer insert component necessitates at least some assembly in frack valves. Other than the inclusion of the insert, conventional manufacturing practice has been to minimize the number of components in a valve assembly.

Conventional pump valves are thus made from a pair of near net shape pieces of low carbon alloy steel that are welded together and then carburized to produce a hard, wear resistant surface. The process of manufacturing such near net shapes is expensive. Alternatively, pump valves are made from high carbon, low alloy steels of one expensive piece that requires detailed finishing, as these alloys are generally not welded.

One form of convention valve manufacturing includes making the components of the valve of high alloy steel such as 8620 or 4130. These are expensive grades of steel for manufacturing a limited life product. Additionally, conventional manufacturing techniques generate material waste.

Conventional valve guides are manufactured by investment casting. It is common practice to forge a one-piece valve and top stem of low carbon alloy steel. The two pieces are welded together and carburized as a single piece.

An alternative known method of making valves is to make a single investment casting of the entire valve for assembly with only the insert. As with the other method, the entire part is then carburized to harden it.

An alternative known method of making valves is to make a single piece forging from a high carbon alloy steel. Areas that require hardened surfaces are induction or flame hardened. However, the only areas of the valve that require hardened surfaces are relatively small and include the face of the valve and the outer edges of the guides.

More recently, multipart valve designs have been disclosed, such as in U.S. Pat. Nos. 9,470,226, and 10,760,568. These patents disclose multipart valves whose components may be assembled by welding or orbit forming. These designs are very economical, allowing selective materials and treatment of those materials based on the function of individual components. These designs further benefit from allowing potential improvements to critical components, such as the wear face of the valve.

U.S. Pat. No. 9,470,226 discloses securing a multipart valve together by inertia welding a retaining cap to a retaining pin. U.S. Pat. No. 10,760,568 discloses providing a retaining pin having an expanded end face formed on its lower end to secure the valve assembly together. Exhaustive testing of these methods has demonstrated the need for further improvements. In particular, these designs are susceptible to bending under the extreme forces imparted on the product during operations. Additionally, accurate centering of the assemblies is challenging. Further, it has proven to be difficult to achieve a consistent and sufficient compression of the assembly that will reliably remain assembled during operations.

Thus, there remains a need for a valve design that has the economic and design advantages of a multipart valve, but that also has the strength and reliability of a solid casting design. The disclosed embodiments overcome the shortcomings of prior multipart valve designs and retain all of the advantages of those constructions.

SUMMARY

The disclosed design provides a pump valve and a method of manufacturing and assembling the pump valve that allows the use of materials usually considered unsuitable for multiple components welded together to be constructed as a weldment.

In a new embodiment featured in this disclosure, a valve assembly is disclosed comprising a unitary insert retainer having a circular retainer head and a retainer pin extending downward from the retainer head. The retainer pin has a cylindrical upper section extending below the retainer head, and a grooved center section extending below the upper section.

A valve is centered on the upper section, adjacent to the retainer head. A polymer insert is located on an exterior perimeter of the valve and beneath the retainer head. A guide having a central portion on its upper end and four legs extending downward from the central portion is centered on the retainer pin beneath the valve.

A collar has a flange portion and a collar body extending below the flange, and an interior bore extending through the flange and the body. The collar is located below the guide central portion. The bore within the body of the collar is swaged against the center section of the retainer pin.

In another embodiment, the grooves on the center section form a helical thread. In another embodiment, the retainer pin is in tension. In another embodiment, a recess is formed on a bottom side of the valve and the central portion of the guide is located in the recess to position the guide closer to the valve.

In another embodiment, the insert retainer has a grooved end section extending below the central portion of the retainer pin portion that is connectable to a swaging tool for swaging the collar to the insert retainer. In another embodiment, the grooves on the end section form a helical thread.

In another embodiment, the flange acts as a spacer between the guide central portion and the swaged body of the collar and uses its larger diameter to distribute the compressive force to the central portion of the guide that is generated from the swaging of the collar body to the end section of the retainer pin.

In another embodiment, the guide central portion has a bore for receiving the retainer pin portion of the insert retainer. A shoulder extends between the central portion and each leg. The shoulder is a substantially flat polygon shape, and permits forming a larger central portion on the guide to accommodate swag tooling and a larger surface for force distribution.

In another embodiment, the collar is made of a first steel having a carbon content of less than 0.2 percent. The insert retainer is made of a second material that has a carbon content higher than the first material. The valve is made of a third material that has a carbon content higher than the second material. The guide is made of a fourth material that is at least as high in carbon content as the third material, and that is harder than the third material.

Advantages and features of the embodiments presently disclosed will become more readily understood from the following detailed description and appended claims when read in conjunction with the accompanying drawings in which like numerals represent like elements.

The drawings constitute a part of this specification and include exemplary embodiments to the disclosed design, which may be embodied in various forms. It is to be understood that in some instances various aspects of the disclosed design may be shown exaggerated or enlarged to facilitate an understanding of the disclosed design.

DETAILED DESCRIPTION

The following description is presented to enable any person skilled in the art to make and use the disclosed design, and is provided in the context of a particular application and its requirements. Various modifications to the disclosed embodiments will be readily apparent to those skilled in the art, and the general principles defined herein may be applied to other embodiments and applications without departing from the spirit and scope of the disclosed design. Thus, the disclosed design is not intended to be limited to the embodiments shown, but is to be accorded the widest scope consistent with the principles and features disclosed herein.

Figure 1:
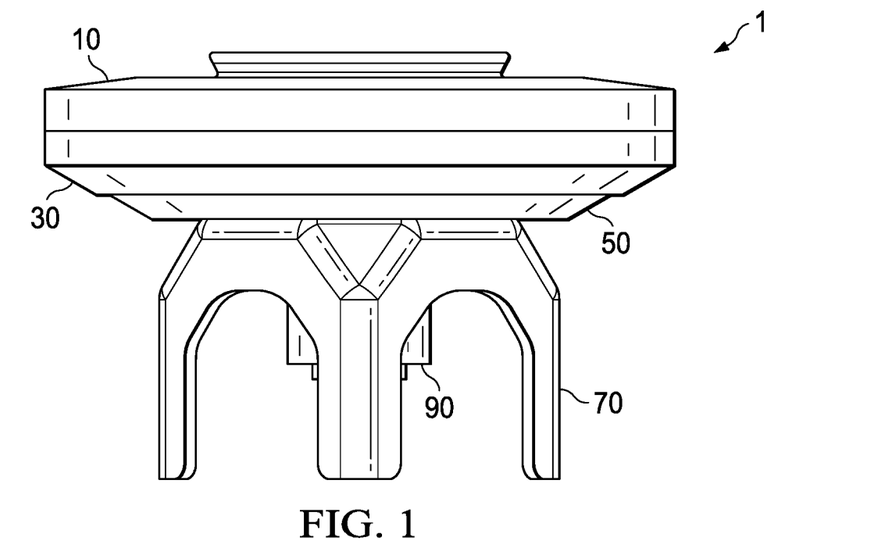
FIG. 1 is a side view of of the valve assembly shown in accordance with certain embodiments of the present invention.

FIG. 1 is a side view of a valve assembly 1.

In a new embodiment featured in this disclosure, valve assembly 1 is disclosed comprising a unitary insert retainer 10. Insert retainer 10 has a retainer head 12 and a retainer pin portion 14 extending below retainer head 12. (See FIG. 3.)

A polymer insert 30 is located beneath insert retainer 10. A valve 50 is located beneath insert 30. A guide 70 is located beneath valve 50. A collar 90 is located on retainer pin portion 14 of insert retainer 10 beneath guide 70. Collar 90 is swaged onto retainer pin portion 14 to secure valve assembly 1 together.

Figure 2:
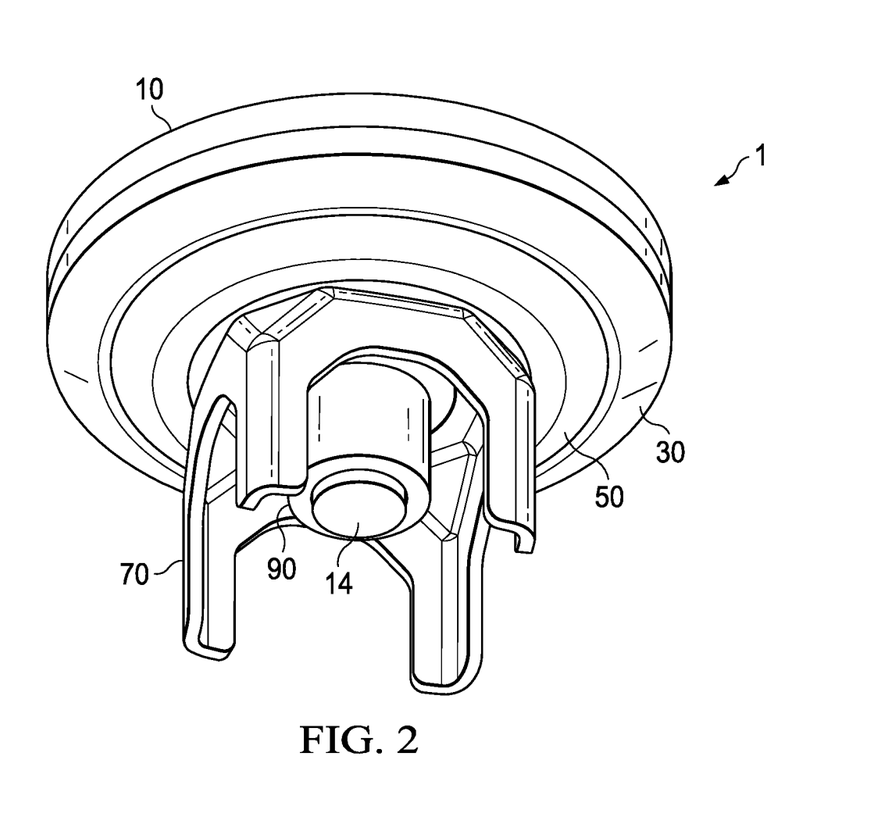
FIG. 2 is an isometric view of the valve assembly of FIG. 1 as viewed from the bottom of the valve.

FIG. 2 is an isometric view of valve assembly 1, as viewed from the bottom of valve assembly 1. In this view, collar 90 can be seen swaged to retainer pin 14 beneath guide 70.

Figure 3:
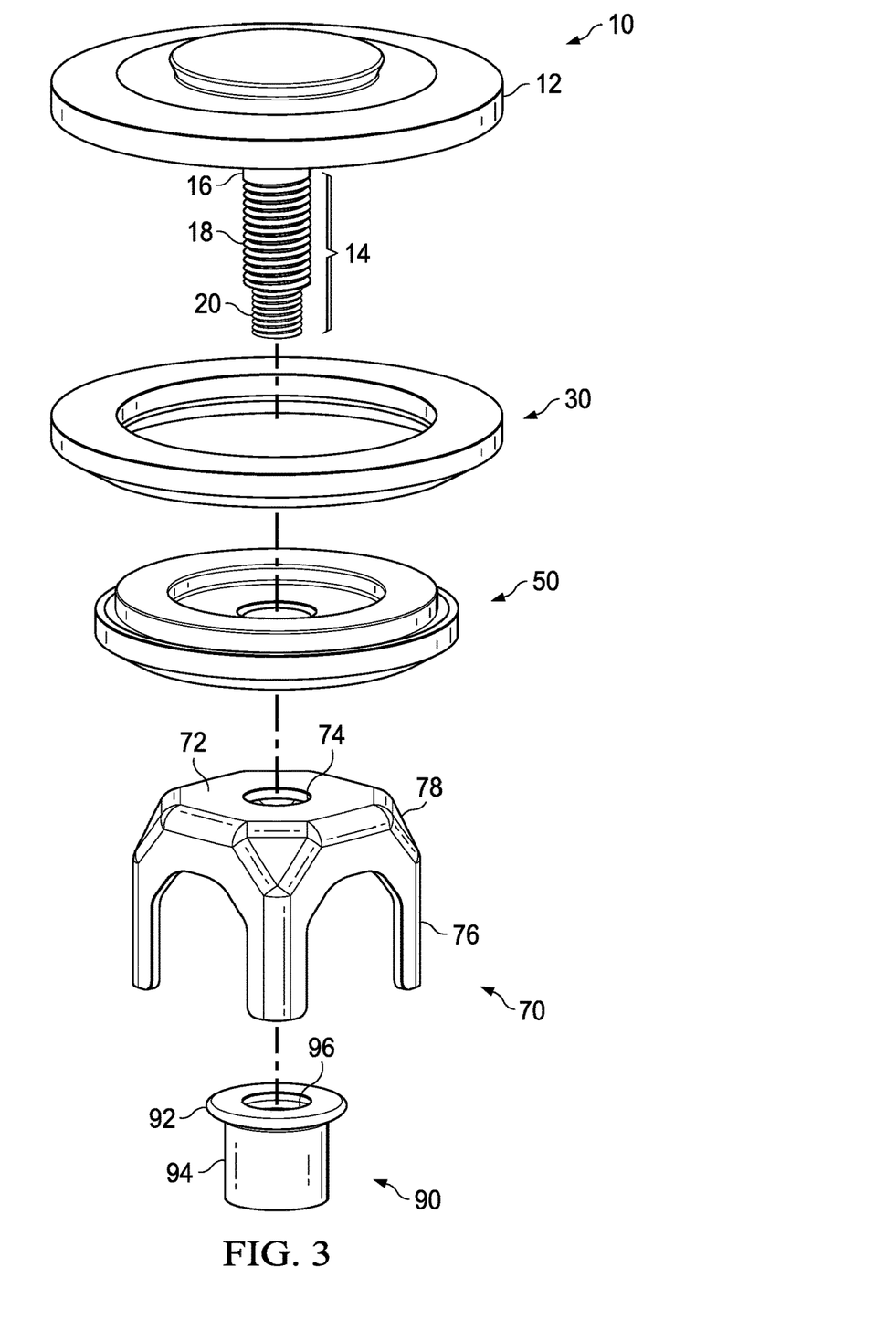
FIG. 3 is an isometric exploded view of the valve assembly illustrated in FIG. 1.

FIG. 3 is an isometric exploded view of the components of valve assembly 1, in accordance with another embodiment. In this view, an embodiment of a preassembled version of insert retainer 10 is illustrated. As seen in this view, a unitary insert retainer 10 has a circular retainer head 12 and a retainer pin 14 extending downward from retainer head 12. Retainer pin 14 has a cylindrical upper section 16 extending downward from retainer head 12.

A grooved center section 18 extends below upper section 16. A grooved lower section 20 has a smaller diameter than upper section 16. As used herein and in particular with reference to this embodiment, a grooved surface is understood to mean any type of grooves, including, but not limited to, concentric grooves or helical grooves such as a threaded surface.

Insert 30 is provided below insert retainer 10 for engagement with retainer head 12. Valve 50 is centered on upper section 16, adjacent to retainer head 12. Insert 30 is located on an exterior perimeter of valve 50, and also beneath retainer head 12. Guide 70 has a central portion 72 on its upper end and four legs 76 extending downward from central portion 72. Guide 70 has an aperture 74 for positioning guide 70 on retainer pin 14 beneath valve 50.

Collar 90 has a flange 92 and a collar body 94 extending below flange 92. An interior bore 96 extends through flange 92 and collar body 94. Collar 90 is located below guide central portion 72. Bore 96 within collar body 94 of collar 90 is swaged against center section 18 of retainer pin 14.

Figure 4:
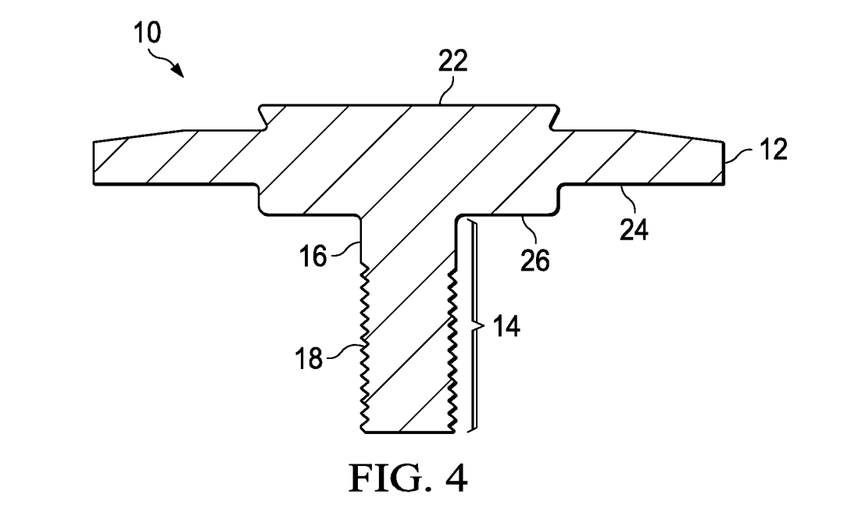
FIG. 4 is a side-sectional view of the insert retainer component of the valve assembly embodiment illustrated in FIG. 1.

FIG. 4 is a side-sectional view of insert retainer 10 of valve assembly 1. Insert retainer 10 has a retainer head 12. Retainer head 12 may have a handle 22 on its top side. Handle 22 facilitates retrieval of valve assembly 1 for maintenance and replacement.

Retainer head 12 has a bottom surface 24 that engages a top surface 36 of insert 30 and also engages valve 50. Retainer head 12 has an extension 26, which extends downward from bottom surface 24. Extension 26 fits into a complementary upper recess 52 on valve 50. This feature adds thickness to retainer 10 to add resistance to bending during operation of valve assembly 1, which has been experienced in previous embodiments of thinner designs.

Retainer pin 14 extends downward from extension 26 of retainer head 12. Retainer pin 14 has a cylindrical upper section 16 extending downward from extension 26 of retainer head 12. A grooved center section 18 extends below upper section 16. As seen in FIG. 3, a grooved lower section 20 may be provided. Lower section 20 has a smaller diameter than upper section 16 and is used for gripping by a tool for swaging collar 90 onto center section 18.

As used herein and in particular with reference to this embodiment, a grooved surface is understood to mean any type of grooves, including, but not limited to, concentric grooves or helical grooves such as a threaded surface.

Retainer 10 may be advantageously made with heat treated 8620 steel or other suitable material. In the embodiment illustrated, heat treatment is optional, but is recommended. This provides strength to resist bending under the forces endured in operation of the valve, as well as sufficient strength to receive the swaged collar 90 onto center section 18.

Beneficial to this embodiment is that there is no need for a separate retainer and stem or any welding thereto or placement of these parts within insert retainer 210. There is also no need to machine recesses on the top of a separate retainer to accommodate a cap. As disclosed, the present design is more economical to manufacture than the plurality of parts disclosed in earlier designs, and has proven to be more reliable in testing.

Figure 5:
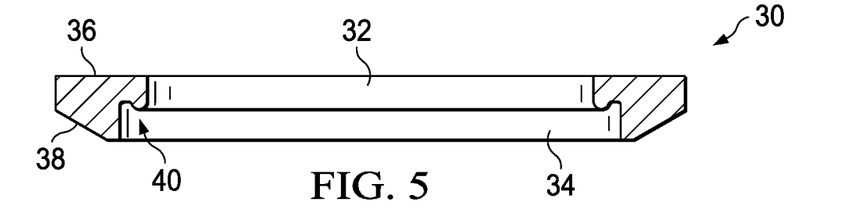
FIG. 5 is a side-sectional view of a polymer insert component of the valve assembly embodiment illustrated in FIG. 1.

FIG. 5 is a side-sectional view of a polymer insert component of the valve assembly embodiment illustrated in FIG. 1.

Insert 30 has a first aperture 32 and a second aperture 34. Insert 30 has a top surface 36 and a face 38. A tongue and groove 40 is provided between first aperture 32 and second aperture 34. Tongue and groove 40 is configured for complementary engagement with a tongue and groove 60 of valve 50 (see FIG. 10) to engage insert 30 with valve 50.

Insert face 38 is commonly angled between 30 and 45 degrees relative to insert top surface 36, such that when insert 30 is located onto valve 50, insert face 38 and a valve face 58 form a semi-continuous surface for engaging the valve seat portion of a valve port.

Insert 30 may be made of urethane or other suitable material that is used to manufacture inserts for conventional valve designs. Insert 30 operates to provide a seal with the valve seat of the valve port when debris common to operations such as fracking prevents a metal-to-metal seal. In a preferred embodiment, insert 30 is compressively fit over valve 50, thereby enhancing the wear performance of the elastomeric insert 30. Specific and unique to this embodiment, insert 30 is compressed between the bottom surface 24 of retainer head 12 and insert and valve tongue and groove connections 40 and 60, which compress insert 30 in the desired amount when collar 90 is swaged to center section 18 of retainer 12.

Figure 6:
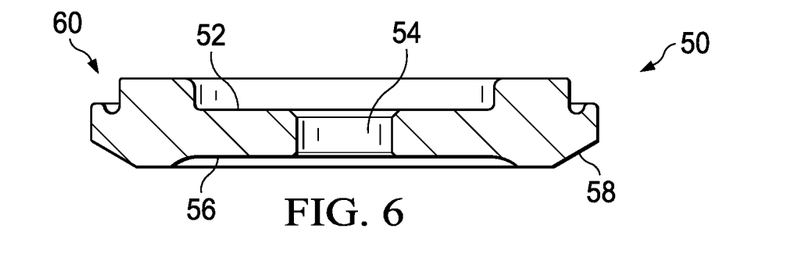
FIG. 6 is a side-sectional view of the valve component of the valve assembly embodiment illustrated in FIG. 1.

FIG. 6 is a side-sectional view of the valve 50 of valve assembly 1. In this embodiment, valve 50 has an aperture 54 for location of valve 50 onto upper portion 16 of retainer pin 14 of insert retainer 10. Valve 50 has an upper recess 52 on its top surface and a lower recess 56 on its bottom surface.

Valve 50 has a valve face 58. A tongue and groove 60 is provided for engaging tongue and groove 40 on insert 30. Lower recess 56 engages a central portion 72 of guide 70 when assembled on retainer pin 14 to position guide 70 higher in the valve assembly 1.

Valve face 58 is commonly angled between 30 and 45 degrees. Valve 50 may be made of suitable steel such as 4150 or other relatively high carbon hard steel. In one embodiment, valve face 58 may be selectively hardened by induction hardening. Advantageously, valve 50 may be heat treated without the requirement to heat treat the entire valve assembly 1.

Figure 7:
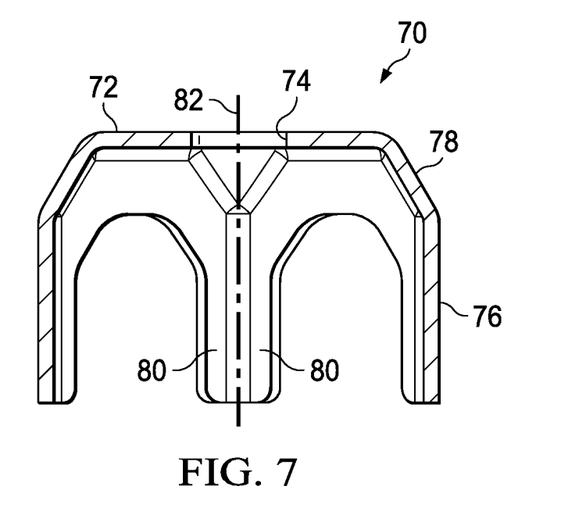
FIG. 7 is a side-sectional view of the guide component of the valve assembly embodiment illustrated in FIG. 1.

FIG. 7 is a side-sectional view of the guide 70 component of valve 1. Guide 70 has a central portion 72 formed at the top of guide 70. A central aperture 74 is located centrally on central portion 72 for locating guide 70 on retainer pin 14. Four shoulders 78 extend downward from central portion 72. A leg 76 extends downward from each shoulder 78. Shoulders 78 provide strength to guide 70 as between the connection of legs 76 to central portion 72, and permit forming a larger central portion 72 on guide 70 to accommodate swag tooling and a larger surface for force distribution as is uniquely required to this embodiment. Shoulders 78 are typically polygonal and may be generally trapezoidal or generally triangular in shape.

As seen in FIG. 7, legs 76 may be formed around a centerline 82 to create opposing sections 80. Forming legs 76 in this manner adds strength and increases resistance to bending. As described above, central portion 72 fits into lower recess 56 on valve 50, positioning legs 76 closer in proximity to valve face 58 to increase the flow rate through valve assembly 1.

Guide 70 may be advantageously and economically created by stamping and cold forming, but guide 70 also requires wear resistance on the exterior surface of legs 76. One material that has proven to be suitable for this component's unique manufacturing and performance requirements is 1050 steel. It has sufficiently high carbon to provide wear resistance and can be formed to the geometry disclosed in this embodiment without detrimental cracking. It may also be selectively induction hardened on legs 76 surfaces to provide the required wear resistance.

Figure 8:
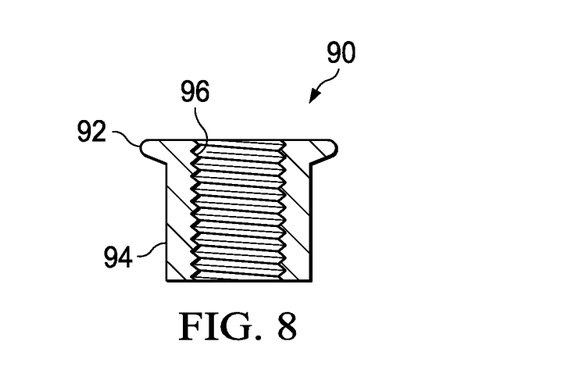
FIG. 8 is a side-sectional view of the collar component of the valve assembly embodiment illustrated in FIG. 1.

FIG. 8 is a side-sectional view of collar component 90 of valve assembly 1. Collar 90 has a flange 92 and a collar body 94. A bore 96 extends through the center of flange 92 and collar body 94. Bore 96 of collar 90 is located on center section 18 of retainer pin 14 of insert retainer 10.

Figure 9:
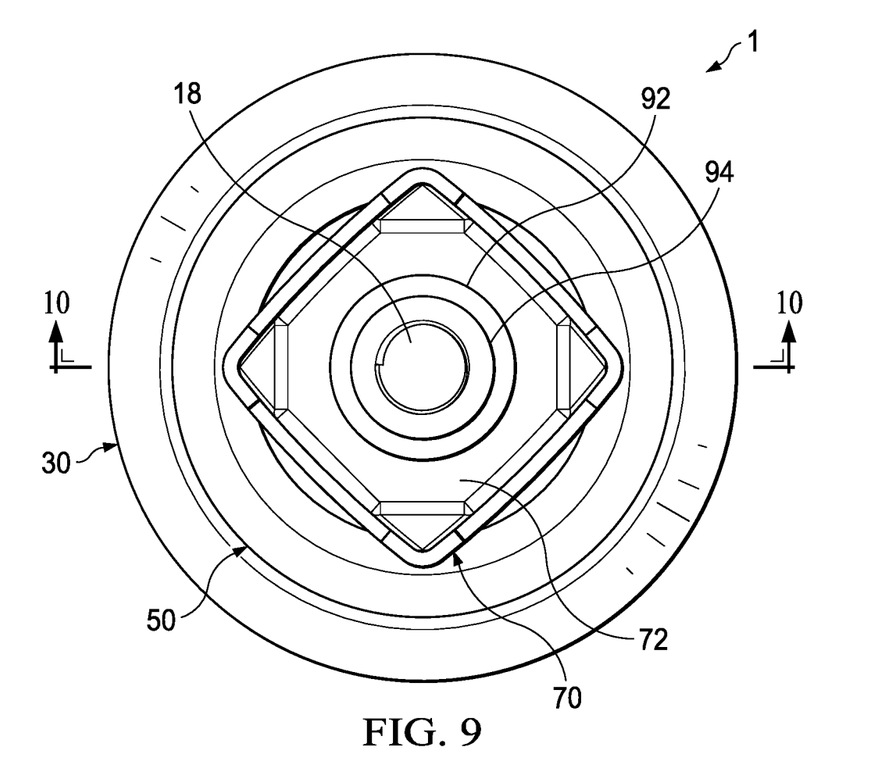
FIG. 9 is a bottom view of an embodiment of the valve assembly embodiment of FIG. 1, illustrating a section line 10-10 through this view of the valve assembly.

FIG. 9 is a bottom view of valve assembly 1, illustrating a section line 10-10 through the center of valve assembly 1. In this view, insert 30 is shown surrounding valve 50. Valve 50 is shown beneath guide 70. Guide 70 is shown beneath collar 90. Collar 90 is shown swaged to retainer pin 14.

Figure 10:
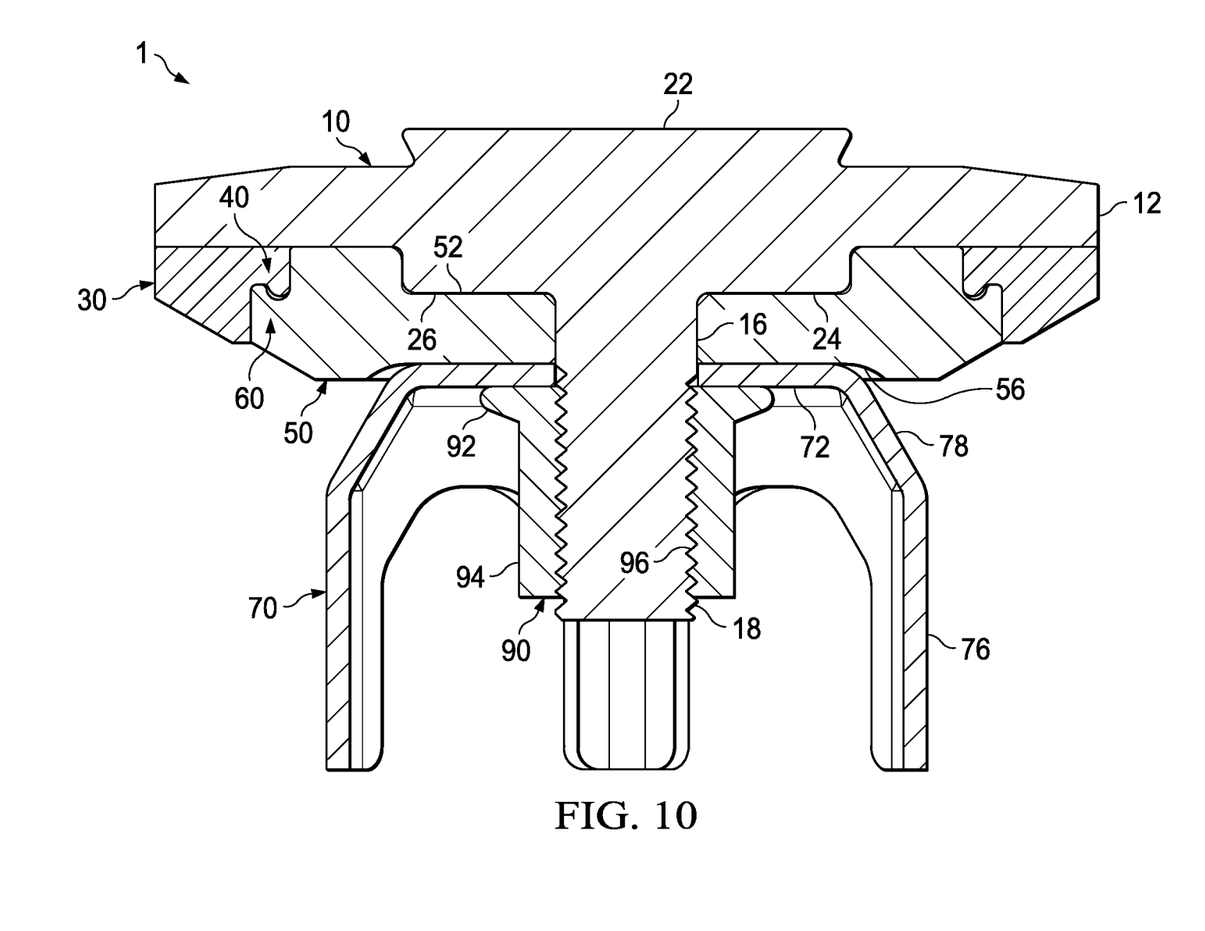
FIG. 10 is a side-sectional view of the valve assembly embodiment of FIG. 9, sectioned at 10-10 as illustrated in FIG. 9.

FIG. 10 is a side-sectional view of the valve assembly 1, as sectioned at 10-10 and enlarged from the illustration of FIG. 9. As shown in this view, insert 30 is installed on the outer perimeter of valve 50. Tongue and groove 40 of insert 30 is located in complementary engagement with tongue and groove 60 of valve 50. Bottom surface 24 on insert retainer 10 engages against valve 50 to properly compress insert 30. Extension 26 of insert retainer 10 is located in upper recess 52 of valve 50. Central portion 72 of guide 70 is located in lower recess 56 of valve 50.

As noted above and shown in FIG. 3, insert retainer 12 may have a lower section 20 that is grooved. Lower section 20 extends past collar 90 and may be used to engage a swaging tool. Central portion 72 of guide 70 of this embodiment is designed to be large enough to accommodate a swaging tool. By engaging the grooves on lower portion 20 of insert retainer 10, the swaging tool may axially compress collar body 94, and thus bore 96, into the grooved portion of center section 18 of insert retainer 10. In this process, flange 92 performs the function of a spacer by absorbing and distributing the compressive forces imparted from the swaging process to central portion 72 of guide 70.

The swaging procedure will place retainer pin 14 in tension as between lower surface 24 of insert retainer 10 and flange 92 of collar 90. This tension will hold valve assembly 1 securely together to a degree both necessary and heretofore unobtainable in a multipart valve assembly. In addition, the swaging process will apply the appropriate pressure to insert 30. After swaging, lower section 20 may be removed, as illustrated in FIG. 10.

It will be understood by a person of ordinary skill in the art that the special performance, assembly requirements, and related constraints placed on each individual component of this assembly demands a critical selection and treatment of materials that is unique to this design. In one embodiment, collar 90 is made of a first steel having a carbon content of less than 0.2 percent. Insert retainer 10 is made of a second material that has a carbon content higher than the first material. Valve 50 is made of a third material that has a carbon content higher than the second material. Guide 70 is made of a fourth material that is at least as high in carbon content as the third material, and that is harder than the third material.

In another embodiment, collar 90 is made of 1005 steel, insert retainer 10 is made of 8620 steel, guide 70 is made of 1050 steel, and valve 50 is made of 4150 steel. In another embodiment, exterior surfaces of guide legs 76 are induction heat treated. In another embodiment, valve face 58 is induction heat treated.

In another embodiment, the ratio of the diameter of flange 92 to a diameter of clearance on central portion 72 is between 0.770 and 0.775. This provides sufficient spacing for a swaging tool, and sufficient flange 92 contact area with central portion 72.

Having thus described the disclosed design by reference to certain of its embodiments, it is noted that the embodiments disclosed are illustrative rather than limiting in nature and that a wide range of variations, modifications, changes, and substitutions are contemplated in the foregoing disclosure and, in some instances, some features of the disclosed design may be employed without a corresponding use of the other features. Many such variations and modifications may be considered desirable by those skilled in the art based upon a review of the foregoing description of preferred embodiments. Accordingly, it is appropriate that the appended claims be construed broadly, and in a manner consistent with the scope of the disclosed design.

The invention claimed is:

1. A valve assembly, comprising:
   an insert retainer comprising a circular retainer head and a retainer pin extending downward from the retainer head;
   the retainer pin comprising:
     a cylindrical upper section extending below the retainer head;
     a cylindrical and grooved center section extending below the upper section; and,
   a valve centered on the upper section of the retainer pin, adjacent to the retainer head;
   an upper recess formed on a top surface of the valve;
   an extension that extends downward from the retainer head;
   the extension located in the upper recess to the valve;
   a polymer insert located on an exterior perimeter of the valve and beneath the retainer head;
   a guide having a central portion on its upper end and four legs extending downward from the central portion;
   the guide central portion centered on the retainer pin beneath the valve; and,
   a collar comprising:
     a flange;
     a collar body extending below the flange; and,
     a bore extending through the flange and the body;
   the collar being located beneath the guide central portion; and,
   the bore within the body of the collar swaged into the center section of the retainer pin.

2. The valve assembly of claim 1, further comprising:
   the grooves on the center section forming a helical thread.

3. The valve assembly of claim 1, further comprising:
   a lower recess formed on a bottom surface of the valve; and,
   the central portion of the guide located in the recess to position the guide closer to the valve.

4. The valve assembly of claim 1, further comprising:
   the flange spacing the guide central portion and the swaged body of the collar from the central portion.

5. The valve assembly of claim 1, further comprising:
   the collar comprised of a first steel having a carbon content of less than 0.2 percent;
   the insert retainer comprised of a second material that has a carbon content higher than the first material;
   the valve comprised of a third material that has a carbon content higher than the second material; and,
   the guide being comprised of a fourth material that is at least as high in carbon content as the third material, and that is harder than the third material.

6. The valve assembly of claim 1, further comprising:
   the collar being made of 1005 steel.

7. The valve assembly of claim 1, further comprising:
   the insert retainer being made of 8620 steel.

8. The valve assembly of claim 1, further comprising:
   the guide being made of 1050 steel; and,
   an exterior surface of a plurality of guide legs are induction heat treated.

9. The valve assembly of claim 1, further comprising:
   the valve being made of 4150 steel; and,
   a valve face portion of the valve is induction heat treated.

10. A valve assembly comprising:
    an insert retainer comprising a circular retainer head and a retainer pin extending downward from the retainer head;
    the retainer pin comprising:

a cylindrical upper section extending below the retainer head; and, a cylindrical and grooved center section extending below the upper section;

a valve centered on the upper section of the retainer pin, adjacent to the retainer head;

a polymer insert located on an exterior perimeter of the valve and beneath the retainer head;

a guide having a central portion on its upper end and four legs extending downward from the central portion;

the guide central portion centered on the retainer pin beneath the valve; and, a collar comprising:
　a flange;
　a collar body extending below the flange; and,
　a bore extending through the flange and the body;

the collar being located beneath the guide central portion;

the bore within the body of the collar swaged into the center section of the retainer pin; and, the ratio of the diameter of the flange to a diameter of clearance on the central portion is between 0.770 and 0.775.

11. A valve assembly comprising:

an insert retainer comprising a circular retainer head and a retainer pin extending downward from the retainer head;

the retainer pin comprising:
　a cylindrical upper section extending below the retainer head; and,
　a cylindrical and grooved center section extending below the upper section;

a valve centered on the upper section of the retainer pin, adjacent to the retainer head;

a polymer insert located on an exterior perimeter of the valve and beneath the retainer head;

a guide having a central portion on its upper end and four legs extending downward from the central portion;

the guide central portion centered on the retainer pin beneath the valve; and, a collar comprising:
　a flange;
　a collar body extending below the flange; and,
　a bore extending through the flange and the body;

the collar being located beneath the guide central portion;

the bore within the body of the collar swaged into the center section of the retainer pin;

the insert retainer having a grooved lower section extending below the center section of the retainer pin;

the lower section being of a smaller diameter than a diameter of the center section; and, the grooved end section connectable to a swaging tool for swaging the collar to the insert retainer grooved-center section.

12. The A valve assembly of claim 1, further comprising:

an insert retainer comprising a circular retainer head and a retainer pin extending downward from the retainer head;

the retainer pin comprising:
　a cylindrical upper section extending below the retainer head; and,
　a cylindrical and grooved center section extending below the upper section;

a valve centered on the upper section of the retainer pin, adjacent to the retainer head;

a polymer insert located on an exterior perimeter of the valve and beneath the retainer head;

a guide having a central portion on its upper end and four legs extending downward from the central portion;

the guide central portion centered on the retainer pin beneath the valve;

a collar comprising:
　a flange;
　a collar body extending below the flange; and,
　a bore extending through the flange and the body;

the collar being located beneath the guide central portion;

the bore within the body of the collar swaged into the center section of the retainer pin;

a central portion having an aperture for receiving the retainer pin portion of the insert retainer;

a shoulder extending between the central portion and each leg; and, the shoulder forming a flat polygon with a radiused perimeter.

\* \* \* \* \*

UNITED STATES PATENT AND TRADEMARK OFFICE
CERTIFICATE OF CORRECTION

| | |
|---|---|
| PATENT NO. | : 11,280,411 B1 |
| APPLICATION NO. | : 17/009580 |
| DATED | : March 22, 2022 |
| INVENTOR(S) | : Johnson et al. |

It is certified that error appears in the above-identified patent and that said Letters Patent is hereby corrected as shown below:

In the Claims

Column 10, Line 12; Claim 12, Line 1: "The A valve assembly of claim 1, further comprising:" should read -- A valve assembly comprising: --

Signed and Sealed this
Twenty-third Day of May, 2023

*Katherine Kelly Vidal*

Katherine Kelly Vidal
*Director of the United States Patent and Trademark Office*